United States Patent [19]

Blair et al.

[11] Patent Number: 5,187,352
[45] Date of Patent: Feb. 16, 1993

[54] MICROPROCESSOR CONTROLLED SECURITY SYSTEM FOR COMPUTERS

[76] Inventors: William Blair, 1154 W. Lunt, Apt. 302, Chicago, Ill. 60626; Stanley J. Brooks, P.O. Box 906, Douglas, Ga. 31533

[21] Appl. No.: 597,422

[22] Filed: Oct. 15, 1990

Related U.S. Application Data

[63] Continuation-in-part of Ser. No. 297,302, Jan. 3, 1989, abandoned.

[51] Int. Cl.[5] .............................................. G06K 5/00
[52] U.S. Cl. ................................ 235/382; 235/382.5; 235/487; 380/25
[58] Field of Search ..................... 235/382, 382.5, 487; 340/825.31; 902/22; 380/25

[56] References Cited

U.S. PATENT DOCUMENTS 3,896,266  7/1975  Waterbury .
4,800,590  1/1989  Vaughan .
4,839,640  1/1989  Ozer et al. ........................... 235/382

OTHER PUBLICATIONS

George Sadowsky, A Proposed Plan for Academic Computing, Spring 1989, pp. 2-13.
Byte Magazine, L. Brett Glass, Part 1 The SCSI Bus, Feb. 1990, pp. 267, 268, 270, 271, 272, 274.
Byte Magazine, L. Brett Glass, Part 2 The SCSI Bus, Mar. 1990, pp. 291-296.
POWER R, Video Products and Price Information, Aug. 1988.
Xico, Inc., Magnetic Stripe Card Terminal Data Sheet and Instruction Manual, Jun. 1986.
Xico, Inc., Drawings, Jan. 25, 1985.
Xico, Inc., Model 2165 RS-232C Controller For Series 6500 Swipe Reader/Encoders User's Manual, Mar. 1986.
Mac Users Magazine, Kurt VanderSluis, The Exorcist, Part II, May 1989, pp. 230, 232.
Apple Computer Inc., AppleTalk Personal Network, Disclosure, Apr. 1986.
Sun Micro Systems, Tech Note 1010, Network Hardware and Cabling Topologies, Aug. 1989, pp. 1-6.
Sun Micro Systems, Tech Note 1011, Cabling with TOPS and Ethernet, Aug., 1989, pp. 1-2.
Centrams Systems West, Inc., Manual, 1987.
Recommac Corp., New Product Release, Model Versions v. H2.1, Dec. 18, 1989, pp. 1-4.
Recommac Corp., New Product Release, Model Versions vH1.0.1 and Model Versions vH2.1, Sep. 19, 1989.
Recommac Corp., Brochure, Jun. 6, 1990.
Recommac Corp., Brochure, Aug. 12, 1990.
Motorola, Microprocessor, Microcontroller and Peripheral Data Book; MC68701U4 technical disclosure; MC68701 technical disclosure; MC6801 and MC6803 technical disclosures (1988).

*Primary Examiner*—Harold Pitts
*Attorney, Agent, or Firm*—Allegretti & Witcoff, Ltd.

[57] ABSTRACT

A microprocessor controlled computer security system is disclosed that provides for controlled access to single or multiple components of a computer system. The security system includes a magnetic card reading and encoding device that reads component access and time allotment data from a magnetically encoded card. A microcontroller, which incorporates a microprocessor, processes the data read by the reading and encoding device and responsively issues enable or disable signals through a component interface circuit to the computer system component or components to be enabled or disabled. The components to be enabled may be the video display device, hard disk drive, or external central processing units of slave computers. The security system further includes audio and visual indicators that provide system and component status information. The magnetic card reading and encoding device is operable in a program mode, wherein the magnetic card is programmed with component access and time data, and a reading mode wherein the reading and encoding device reads and updates the access and time data on the card.

26 Claims, 5 Drawing Sheets

MICROPROCESSOR CONTROLLED SECURITY SYSTEM FOR COMPUTERS

This is a continuation-in-part of application Ser. No. 297,302, filed Jan. 13, 1989, and now abandoned.

BACKGROUND OF THE INVENTION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

A. Field of the Invention

The present invention relates generally to a microprocessor controlled security system for computers, especially personal computers. More particularly, it relates to a computer security system accessed by magnetically encoded cards that allows control of personal computer access and time usage, internally recorded data and attached peripheral devices.

B. Description of Related Art

With personal computers and their applications becoming more commonplace, an increasing number of such computers are being placed in multi-user environments. For example, universities and other educational institutions often give their students access to many personal computers, and allow the same computer to be used by any of a number of different students. Typically, a university or other institution might make personal computers available in a library for the use of students who are studying or conducting research.

Similarly, businesses will often make one or more personal computers available for use by multiple employees, who perform the same or similar tasks, or who may even perform dramatically different tasks. In either circumstance, the computer may have any of a variety of built-in or peripheral features, such as disk drives (floppy disks, hard disks, CD ROM's, etc.), printers, optical scanners, modems, FAX machines, MIDI devices, or video devices.

When personal computers are made available for use by multiple individuals, the organization owning the computer often wants to maintain control of the access to those computers, and their peripherals. Thus, educational institutions and businesses may keep their personal computers within locked rooms and allow entry into the room only by those with authorization to access the computers.

Organizations having such multi-user computers often seek to allocate the expenses for each computer's use, either in the organization's accounting procedures or through actual charges to users. Such charges are either made directly to the individual users, or are allocated for accounting purposes in accordance with the tasks performed by those individuals. Thus, a university may keep track of the students who use computers and their peripherals by academic department to determine whether more expenses associated with personal computers should be allocated to one department or another, or the university may require students or other users to "pay by the hour" for their actual use of computer time. Likewise, organizations may want to limit access to certain costly peripherals, such as laser printers. Business environments have similar requirements.

Computer-owning institutions could, of course, place each computer within a locked room (with different rooms having different combinations of peripherals) and allow students or other users access to those rooms only for limited and carefully controlled times. However, a simple locked room is often inadequate to provide proper security for personal computer data and makes accurate accounting of the individuals who use computers and their peripherals, and the amount of use by each individual difficult. Such methods are cumbersome and, in any event, unlikely to be followed with the consistency necessary for accurate accounting or cost charging.

Another potential multi-use circumstance for personal computers is in a classroom environment, where one "master" computer, associated with an instructor, displays its data on the screens of a number of "slave" computers, each associated with one or more students. These screens and their internal hard drives can also be driven by the "master computer" independent of individual computers. In that circumstances, the instructor often wants control over the activation of the individual computers or screens so as to fully control the lecture or other educational environment. Aside from physically disabling the "slave" computers, hard drives, or screens by, for example, disconnecting the equipment from its power source, few methods have been traditionally available for allowing instructors to have such control.

Due to the need for security for personal computer systems, it is not surprising that considerable effort has been made in the prior art to meet the needs of computer-owning institutions. Simple password techniques are perhaps the most familiar, where access is gained by the user by entering a password into the computer. Password generating machines combined with computer interfacing devices are also known int he art, one example being U.S. Pat. No. 4,800,590 issued to Vaughn. Other security techniques include call and call back systems, security by encoding messages and data, and "trapdoor" encryption schemes. However, such computer access and security techniques each have their limitations. Most do not provide for limited time access, and some are too expensive or impractical for personal computers or personal computer networks. Additionally, many prior art methods are not suitable for selective access to peripheral devices linked together through a peripheral data bus to a master computer.

Accordingly, it is an object of this invention to provide a system for controlling access to personal computer and peripheral devices to authorized users.

It is also an object of this invention to provide a computer security system that is suitable for personal computers, and that is both practical and of reasonable cost.

A further object of this invention is to provide security for data that is held within such personal computers, when the data is held within internal or physically attached hard disks or other data storage devices.

Yet another object of this invention is to provide a means for accurately recording and accounting for the time used by each computer users on the equipment. A related object is to provide an ability to disable the operation of personal computers when their operation is not authorized, or when the elapsed time used by a computer user reaches a predetermined time limit.

SUMMARY OF THE INVENTION

These and other objects of this invention are obtained by providing a microprocessor controlled security system for controlling access to personal computer video displays, data storage devices, accessories, and peripherals. The security system includes a magnetic card reading and encoding device for reading input signals form a magnetically encoded card which includes at least one magnetically encoded data track. The security system also includes a microcontroller that processes the input signals read by the magnetic card reading and encoding device, and responsively provides component enable and disable signals for computer video displays, data storage device, computer accessories, and computer peripherals. A component interface is further provided which enables and disables at least one component of the computer system in response to the component enable and disable signals provided by the microcontroller. The security system further includes indicators which indicate the status of the security system and the components in response to indicator signals from the microcontroller.

The microcontroller and reading and encoding device provide the capability to program time and component access data onto the magnetically encoded card. The card, once programmed, is inserted into and out of the reading and encoding device to gain access to the component that corresponds to the data track that is programmed. Subsequent insertion and removal of the card disables the component, and the residual time remaining to the user is written onto the card as it is withdrawn.

Thus, the security system controls access to components of the computer system depending on the data that is programmed onto the magnetically encoded card. The computer-owning institution has control of access to computers and peripheral devices depending on how it chooses to program and distribute the cards. The system is practical and of relatively low cost as well.

Control over access to internally stored data is controlled by programming access and time data onto a card that is designated a hard disk drive card. Similarly, control over peripheral devices is achieved by programming the card to gain access to a peripheral device over the peripheral data bus.

Recording the accounting for time usage is provided by selecting the amount of time to be programmed onto the time field of the data track on the card. When the authorized amount of time is nearly up, the user is alerted by the indicators (audio and/or visual) and the component is disabled at the expiration of the authorized time.

Other features, objects, and advantages of the invention will become apparent from the following detailed description of the preferred embodiment and explanation of practice and use of the system described below.

BRIEF DESCRIPTION OF THE DRAWINGS

In the detailed description of the preferred embodiment and alternative embodiments which follows, reference will be made to the accompanying drawings wherein like numerals in the text refer to like elements of the various drawings, and in which.

DETAILED DESCRIPTION OF THE PREFERRED EMBODIMENT

Figure 1:
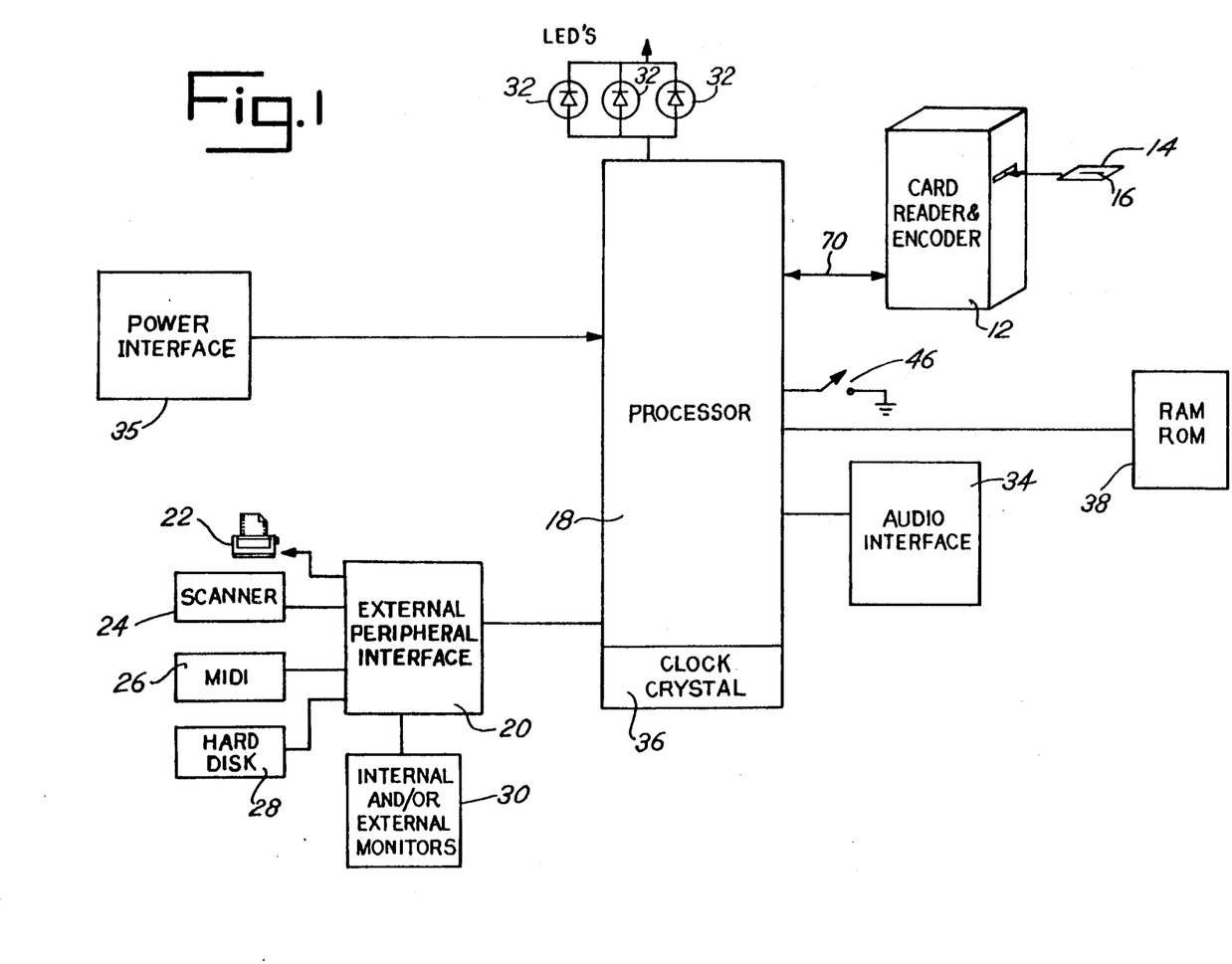
FIG. 1 is a general block diagram of the microprocessor controlled computer security system of the present invention.

Referring to FIG. 1, the elements of the microprocessor controlled security system 10 can be seen in block-diagram form. The system 10 includes a magnetic card reading and encoding device 12 which reads input signals from a magnetically encoded card 14 which includes at least one magnetically encoded data track 16. A microcontroller 18 which includes a microprocessor processes input signals read by the magnetic card reading and encoding device 12, and responsively provides component enable or disable signals to a component interface 20 for enabling or disabling various components of a computer system such as a printer 22, scanner 24, MIDI 26, disk drive 28, or internal or external video monitors 30.

The microcontroller 18 further issues indicator signals to various indicators, such as LED's 32 for indicating to the user the status of the components and the security system. The operation of the indicators 32 is controlled by the microcontroller 18. Audio indicators are provided through an audio circuit 34 which is also controlled by the microcontroller 18. The microcontroller 18 provides a first indicator signal to the audio circuit 34 when a certain fraction of computer access time remains allocated on the time field, for example, 1/60 (at one minute when 60 minutes was originally authorized). A second indicator signal is provided when a second fraction, say 1/120, of computer access time remains allocated in the time field. The indicators give notice to the user that access time is about to expire, and thereby giving the user a chance to save his or her files.

The microcontroller 18 has a clock crystal circuit 36 for measuring time and providing clock inputs to the microcontroller. The microcontroller 18 also is provided with a RAM/ROM computer memory 38 that stores the system operating code and transitory data.

In one possible embodiment, the magnetic card reading and encoding device 12, microcontroller 28, memory device 38 and interface 20 are incorporated into the housing of a personal computer, but they may be positioned external of the computer. In the preferred embodiment, the security system is installed in a host or master personal computer manufactured by Apple Computer, and controls access to peripheral devices and remote personal computers through a bus interface in the external peripheral interface 20.

Referring again to FIG. 1, the magnetic card reading and encoding device 12 is a standard "off-the-shelf" magnetic card reader/encoder. In the preferred embodiment, the reading and encoding device 12 is the XICO, Inc. Model 7702SA insertion card reader/encoder peripheral unit, available from XICO, Inc. 9737 Eton Avenue, Catsworth, Calif. 91311.

The microcontroller 18 in FIG. 1 is preferably a Motorola MC68A701S Controller 100 microprocessor. The microcontroller 18 is programmed with resident software (see Appendices) for controlling operation of the computer security system 10. The particular amount of time to be programmed on the cards and the choice of which components to be accessed by the card is made by changing the software for the microcontroller.

Figures 2, 3:
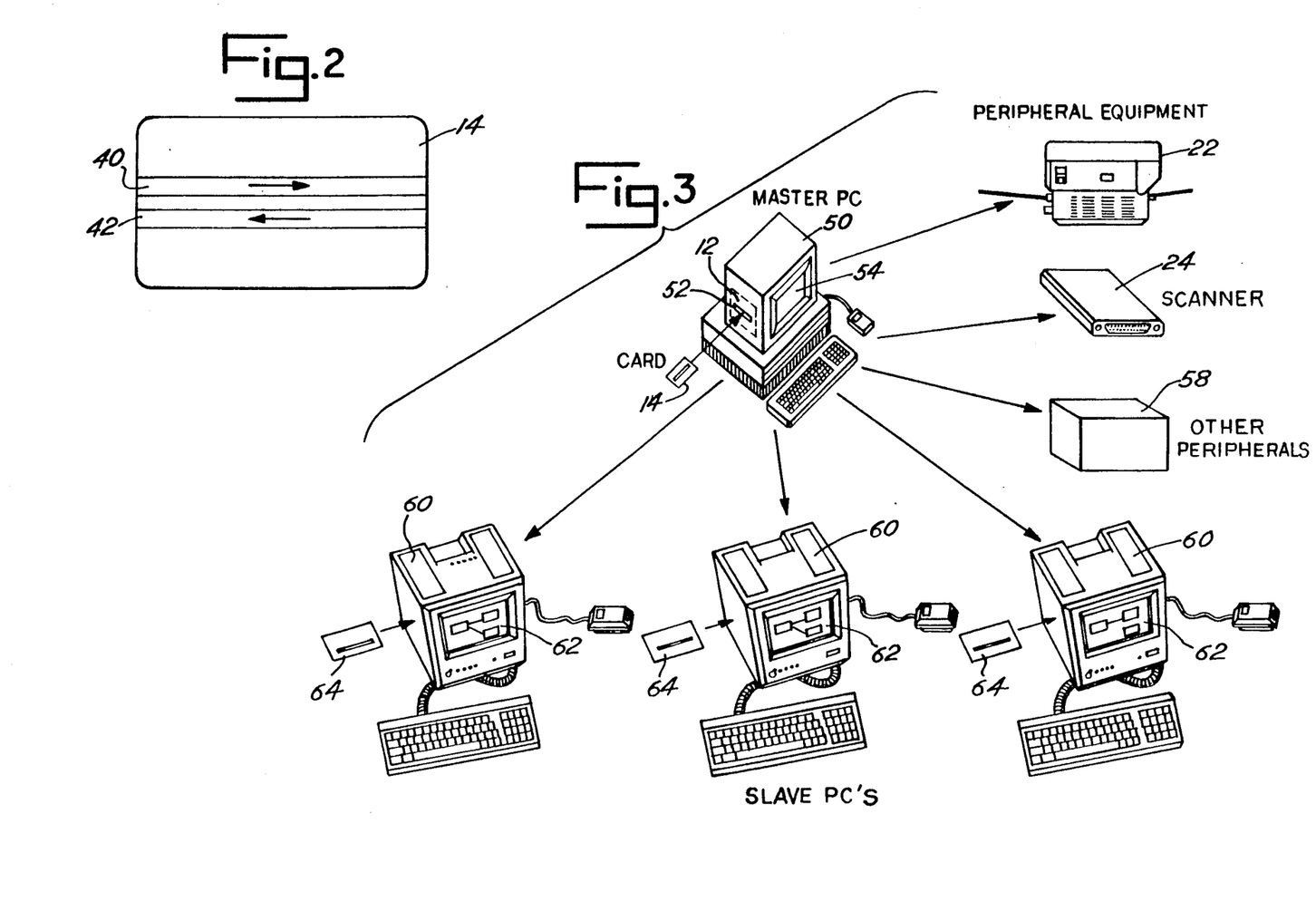
FIG. 2 is an illustration of a bidirectional magnetically encoded card employed in the present invention.
FIG. 3 is a diagram depicting the environment in which the security system of FIG. 1 may be employed.

Referring now to FIG. 2, the magnetically encoded card 14 is shown as comprising a bidirectional card that includes two data tracks 40 and 42. The data tracks 40 and 42 are independently read by the magnetic card reading and encoding device 12 depending on the direction in which the card 14 is inserted into the device 12. The data tracks 40 and 42 are encoded to enable or disable one or more computer system components or external peripheral accessories, as will be explained below. The card 12 may include a pair of additional data tracks on its reverse side for a total of four data tracks. Additionally, data tracks 40 and 42 may include a time field for computer access time accounting purposes. The data tracks 40 and 42 of the magnetically encoded card 14 are encoded by an authorized system operator by activating a switch 46 connected to the microcontroller 18 (FIG. 1) on selected security systems.

Referring now to FIG. 3, the computer security system of the present invention is shown installed in a host or master computer 50. The magnetically encoded card 14 is inserted through a slot 52 to be read by the magnetic card reading and encoding device 12 (FIG. 1) built into the host computer 50. Depending on how the card 14 is encoded, the video display 54 may be disabled or enabled, the internal disk drives (not shown) may be disabled or enabled, or various peripheral devices such as a printer 22, scanner 24 or other peripherals 58 may be enabled or disabled. It is also possible to enable or disable slave PC's 60 or remote central processing units linked through a peripheral bus to the host computer 50. The peripheral bus referred to herein will normally be the SCSI (Small Computer Systems Interface) bus common to personal computers.

In the preferred embodiment, the security system provides restricted access to host computer 50 by controlling the video display 54 and the hard disk drive 28 (not shown in FIG. 3). Video display 54 is enabled by inserting and retracting the magnetically encoded card 14 into and out of the reading and encoding device 12 such that data track 40 (FIG. 2) is read, and the hard disk drive 28 is enabled by inserting and retracting the magnetically encoded card 14 such that data track 42 is read. The video display 54 and the hard disk drive 28 are disabled by a subsequent insertion and retraction of data tracks 40 and 42 into and out of the reading and encoding device 12.

In the preferred embodiment, data tracks 40 and 42 include a time field allocating a predetermined amount of computer access time. The time field included in the data track for enabling and disabling the hard disk drive 28 is reduced an amount proportional to the time during which hard disk drive 28 is enabled. Upon expiration of the access time allocated by the time field, hard disk drive 28 will be disabled by security system 10. However, security system 10 provides an audio and visual warning indicating when there are approximately 2 and 1 minutes of computer access time remaining in the time field, thereby allowing the user to save any data before hard disk drive 28 is disabled. Additionally, upon enabling the hard disk drive 28 by inserting and retracting the card 14 into and out of the reading and encoding device 12, the device 12 zeros the time field on the card 14 as the card 14 is retracted from the device 12, thereby preventing the card 14 from being used to access another computer protected by a similar computer security system. The card 14 is credited with any residual computer access time remaining in the time field upon disabling the hard disk drive 28 by a subsequent insertion and retraction of the card 14 into and out of the reading and encoding device 12. In the preferred embodiment, the time field included on the data track for enabling and disabling video display 54 is not reduced by the computer security system, as is the time field included on the data track for enabling the disabling hard disk drive 28. A random number (up to 8 bed digits) is written to a card that has successfully enabled a component before the card is completely withdrawn. This insures another card cannot be used to disable the component.

In an alternative embodiment, the data tracks on the card 14 may be encoded to enable and disable the disk drives or the video displays of a plurality of slave computers 60 or monitors 62, or any combination of the external peripheral equipment stated above. Video display monitors may be controlled by controlling the video signal, or the video display power supply. Additionally, the slave computers 60 may also include a computer security system 10 having magnetically encoded cards 64 encoded to enable and disable computer components and external peripheral equipment in a manner as state above with regard to the host computer 50.

Security System Operating Flow Diagram

Figure 4:
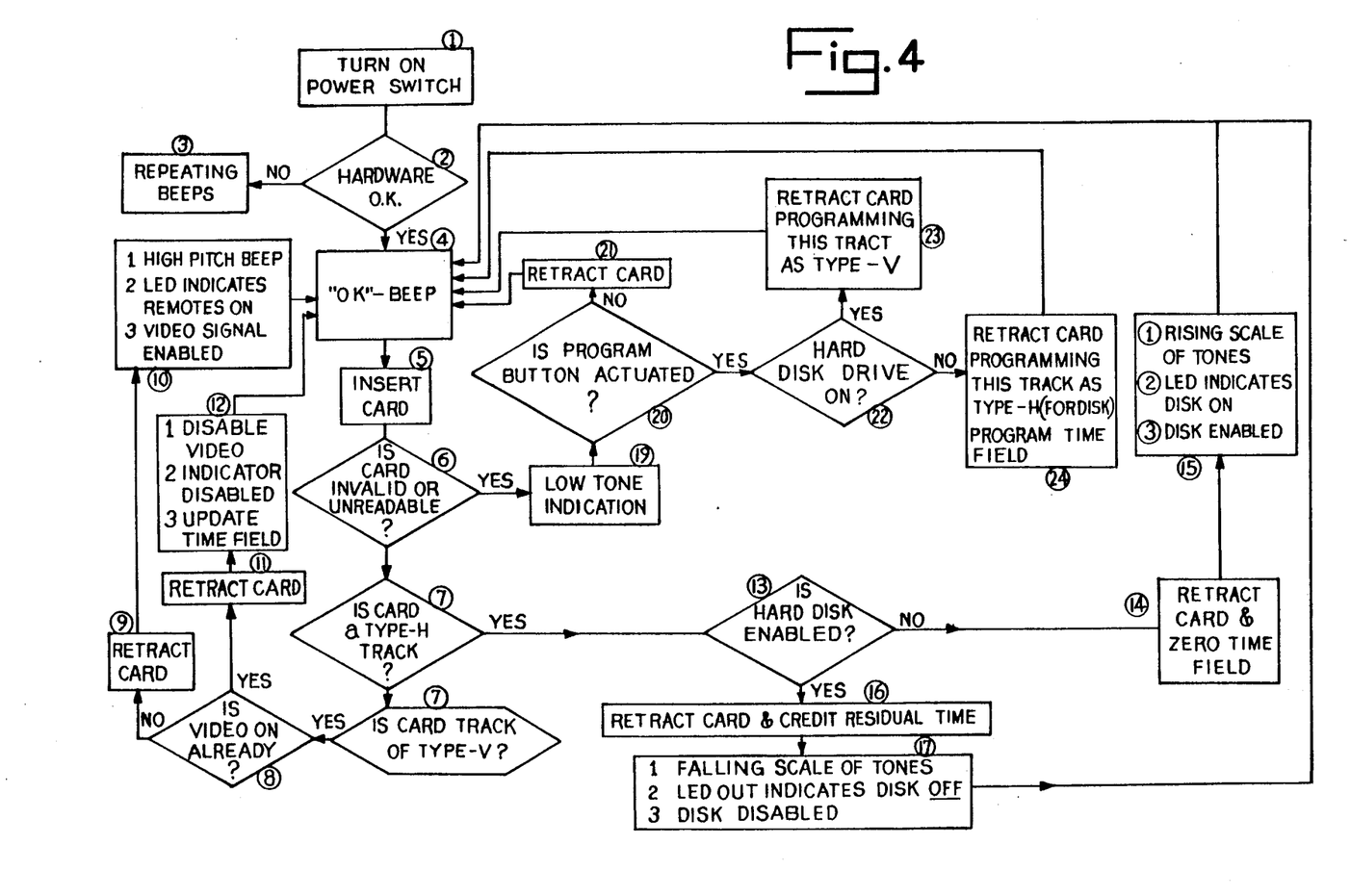
FIG. 4 is a flow diagram depicting the general operation of the preferred embodiment of the present invention.

The operation of a preferred embodiment of the computer security system is illustrated in the flow diagram of FIG. 4. For simplicity, the external peripheral interfaces to be enabled or disabled by the security system are the video display and the hard disk drive of the host computer.

Power is applied to the computer security system upon activation of the host computer at Step 1. The computer security system performs a hardware test at Step 2. The test is limited to security system circuitry, aside from the shot computer power supply from which it derives its power. A computer security system hardware failure is indicated at Step 3. The computer security system indicates that the card reading and encoding device is waiting to read a magnetized card at Step 4. A magnetically encoded card is inserted into the card reading and encoding device at Step 5. The computer security system determines whether the magnetic card data track is invalid or unreadable at Step 6 upon insertion of the card into the card reading and encoding device at Step 5. An unreadable card has either the wrong address code or has had its magnetic field erased.

The computer security system determines whether the hard drive data track or the video display data track has been inserted into the card reading and encoding device at Step 7. Insertion of the video display data track on the card into the card reading and encoding device will prompt the computer security system to determine whether the video signal is enabled at Step 8. If the video is not on, upon retraction of the card from the card reading and encoding device at Step 9, a disabled video signal is enabled at Step 10. The computer security system also indicates that the video display has been enabled. Upon completion of Step 10, the computer security system indicates that the card reading and encoding device is awaiting to read a card at Step 4.

If the video is on, upon retraction of the card from the card reading and encoding device at Step 11, the video signal is disabled at Step 12. The computer security system also indicates that the video display has been disabled. The time field on the card is also updated in Step 12. Upon completion of Step 12, the computer security system indicates that the card reading and encoding device is waiting to read a card at Step 4.

Insertion of the hard drive data track on the card into the card reading and encoding device will prompt the computer security system to determine whether the hard drive is enabled at Step 13. If the hard disk is disabled, upon retraction of the card from the card reading and encoding device at Step 14, the time field on the card is set to zero. The computer security system enables the hard drive at Step 15 and provides an indication of the enablement before indicating that the card reading and encoding device is awaiting to read a card at Step 4.

If the hard disk is enabled, upon retraction of the card, at Step 16, any residual time is credited to the magnetically encoded card, i.e., the time field is reduced in proportion to the period of time that the disk drive was enabled. The computer security system disables the disk drive at Step 17 and provides an indication of the disablement before indicating that the card reading and encoding device is awaiting to read a magnetized card at Step 4.

As the flow diagram illustrates, it is necessary to insert and retract the magnetically encoded card into and out of the card reading and encoding device tow times, once for each data track, to enable both the disk drive and the video display.

The determination of an invalid or unreadable card at Step 6 prompts the computer security system to indicate an invalid data track has been inserted into the card reader at Step 19. The computer security system then determines whether the program switch is activated at Step 20.

A deactivated program switch prompts the computer security system to return to Step 4 upon retracting the card at Step 21. If the program switch is activated, the computer security system is prompted to validate the magnetic card by programming the data tracks.

Step 22 determines whether the hard disk drive is enabled. An enabled hard disk drive prompts the security system to validate the data track for enabling and disabling the video display. The data track is programmed as the card is retracted from the card reader at Step 23. Upon retracting the card at Step 23, the computer security system returns to Step 4.

A disabled hard drive prompts the computer security system to validate the data track for enabling and disabling the hard drive. The data track is programmed as the card is retracted form the card reading and encoding device at Step 24. A time field is also programmed onto the data track. Upon retracting the card at Step 24, the computer security system returns to Step 4.

As illustrated by Steps 22, 23, and 24 of the flow diagram, it is necessary to program one data track at a time on a new or expired card, thereby requiring that the card be inserted and retracted into and out of the card reading two times to program the video and hard disk data tracks. Additionally, an incorrect read or write as the magnetic card is retracted from the card reader, such as may occur in Steps 9, 11, 14, 16, 21, 23, and 24, is indicated by the security system. The step may be repeated by reinserting the card into the card reader.

Figure 5:
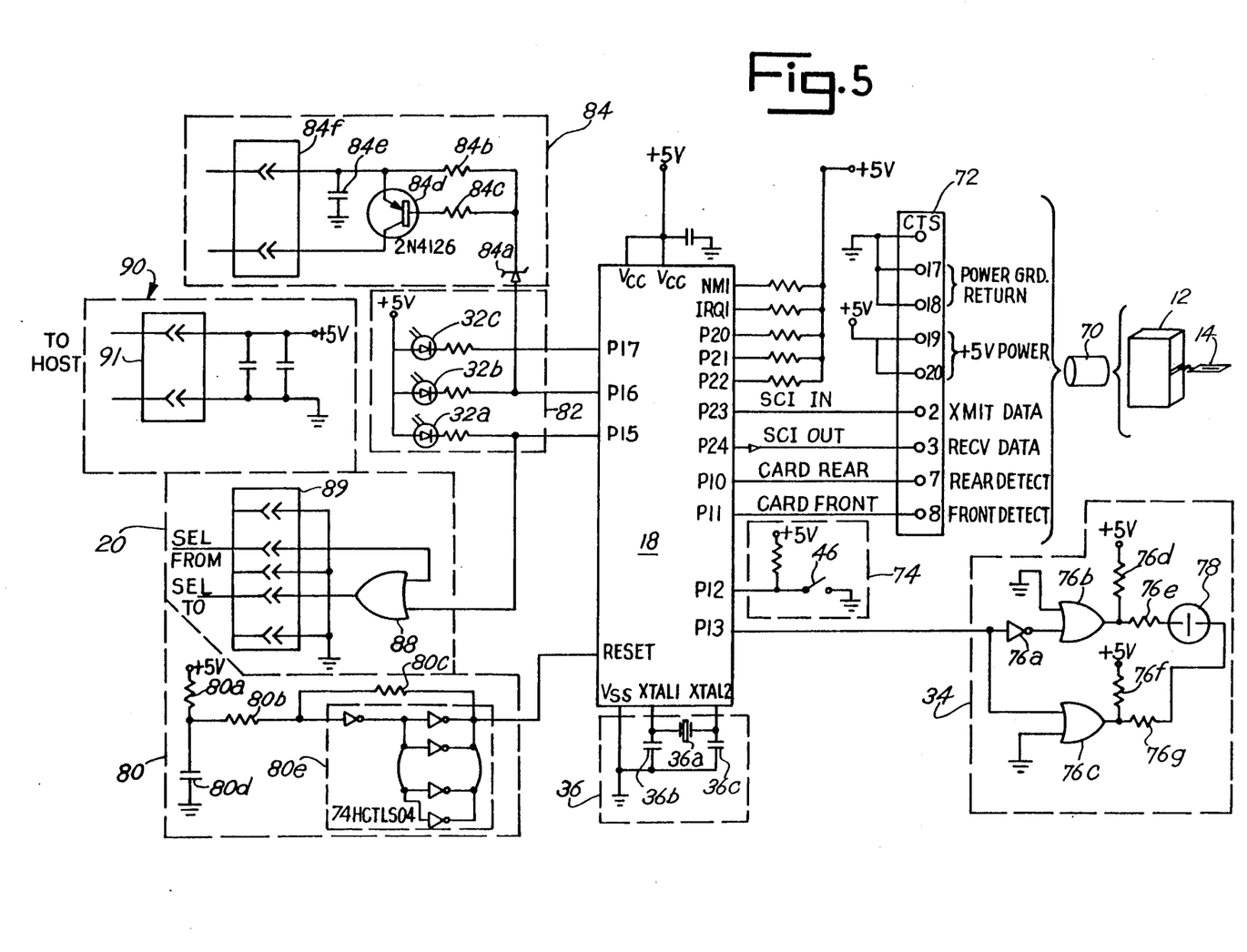
FIG. 5 is a detailed circuit diagram of a preferred embodiment of the present invention shown in FIG. 1.

A circuit diagram illustrating the preferred embodiment of the invention is shown in FIG. 5. The microcontroller 18 unit for the preferred embodiment, as stated previously, is the Motorola MC68A701S Controller 100. The microcontroller 18 is a 40 pin device, which contains 2K bytes of electrically programmable read only memory (EPROM) and 128 bytes of random access memory (RAM). Of course, other microcontrollers with different size memories may be suitable for particular applications. The control software lies in the on-chip EPROM. Power requirements for the microcontroller 18 are 5 V DC ±5% at 80 mA. In FIG. 5, the notations "P12", "NMI", etc. indicate the pins to be connected to the various circuits, power supplies, and components as shown in the diagram.

A clock circuit 36 is provided to the microcontroller 18. The clock crystal 36a is a 4.9152 MHz crystal. However, the software (see appendices) provides that if the 4.9152 MHz crystal is unavailable, a 5.0688 MHz crystal can be used, the crystal not being used is "commented out" of the software. Bypass capacitors 36b and 36c provide noise and parasytics immunity.

The microcontroller 18 interfaces with the magnetic card reading and encoding device 12 through a standard 20-pin flat ribbon cable 70. An adapter 72 is the intermediary between the microcontroller 18 and the cable 70. The cable 70 carries power to the reading and encoding device 12, and uses 5 signal lines: Clear to Send (CTS), Transmit Data (XMIT DATA), Receive Data (RECV DATA), card front detect, and card rear detect. The predominant mode of communication between the microcontroller 18 and the reading and encoding device 12 is TTL-level serial ASCII asynchronous 9600 baud, 7 bit word, no parity, 2 stop bits. The reading and encoding device must be strapped to operate in that mode.

A program switch circuit 74 containing the program switch 46 is provided to the microcontroller to permit the operator of the computer system to encode data tracks 40 and 42 of magnetic card 14 upon insertion of the card 14 into the reading and encoding device 12.

A power-on reset generator circuit 80 is provided to the microcontroller for supplying the reset voltage/current levels for power-up reset of the microcontroller 18. The reset generator circuit includes resistors 80a–c, capacitor 80d, and a 74HCTLSO4 CMOS logic chip shown as invertor network 80e. The output of the logic chip is provided to the RESET pin on microcontroller 18.

Microcontroller 18 also provides indicator signals to an audio indicator circuit 34. While other audio indicator circuits are possible, the preferred embodiment audio circuit incorporates a piezo-electric buzzer 78 responsive to indicator signals from the microcontroller 18. The audio circuit includes invertor 76a, OR gates 76b and 76c, and associated resistors 76d–g.

An additional means for indicating the status of the components of the security system is the LED indicator circuit 82. The red, yellow and green indicator lights 32a, b, and c, respectively, are responsive to indicator signals from the microcontroller 18.

The video display for the computer system is enabled or disabled by video adaptor interface circuit 84. The video adapter interface circuit includes zener diode 84a, resistors 84b and 84c, transistor 84d, capacitor 84e, and a two pin adapter 84f having pins on 0.100 inch centers.

An external peripheral interface circuit 20 interfaces between microcontroller 18 and the hard disk drive, printer, or other external peripherals of the host computer system, slave computers, or remote central processing units. The OR gate 88 has as inputs an enable or disable signal from the microcontroller 18 and the select (SEL) signal from the peripheral bus. The output of the OR gate is supplied to the select (SEL) line to the peripheral bus. A 5 pin adapter 89 having 0.100 inch centers provides the output of the interface circuit 20 to the peripherals along the bus (not shown).

The microcontroller 78, card reading and encoding device 12, and other system accessories are powered by a power interface circuit 90. The power interface circuit 90 receives power from the host computer. Typically, the power is supplied from the power to the host disk drive. A standard two pin junction 91 having pins on 0.200 inch centers connects between the host computer and the security system.

Figure 6:
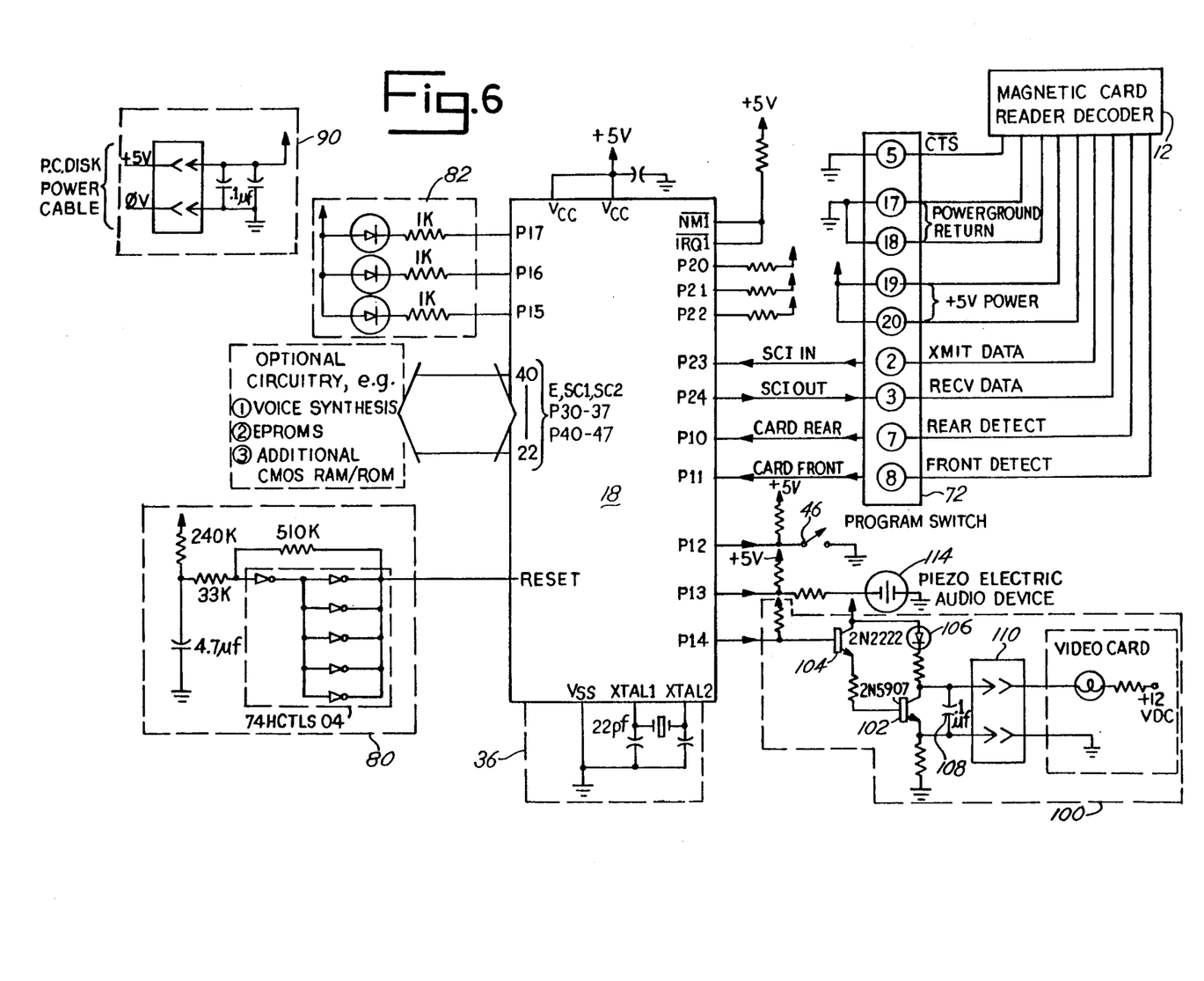
FIG. 6 is a detailed circuit diagram of an alternative embodiment of the present invention.

An alternative embodiment of the present invention is depicted in circuit diagram form in FIG. 6. The microcontroller 18, power-on reset generator circuit 80, LED indicator circuit 82, clock circuit 36, magnetic card reading and encoding device 12 and adapter 72, and power interface circuit 90 are the same as in the preferred embodiment of FIG. 1. The alternative embodiment differs in that the microcontroller 18 provides enable/disable signals to a video tube power interface circuit 100, and enables or disables the video card by interrupting the power to the tube. In this embodiment, the external peripheral interface circuit and video adapter interface circuit are not present. However, it is possible to combine in one embodiment any two of the three component interface circuits shown in FIGS. 5 and 6—the video adapter interface circuit 84 (FIG. 5), the external peripheral interface circuit 20 (FIG. 5), and the video tube power interface circuit 100 (FIG. 6).

The video tube power interface circuit 100 includes first and second transistors 102 and 104, a LED indicator light 106 that lights when video tube disablement is imminent, and the associated resistors. A capacitor 108 is connected between the collector and emitter of the first transistor 102.

The alternative embodiment of FIG. 5 also includes a simple audio indicator circuit comprising a sound producing device such as a piezo-electric buzzer 114.

Additional, optional circuitry may be connected up to the microcontroller 18, for example, voice synthesizer or additional RAM or ROM memory devices. While such optional circuitry is illustrated in conjunction with the alternative embodiment of FIG. 6, it is to be understood that the preferred embodiment of FIG. 5 may also incorporate such optional circuitry. Additionally, various EP ROM chips, each with different software to provide different accessability of components, may be included in the preferred and alternative embodiments.

While there has been set forth preferred and alternative embodiments of the invention, it is to be understood that changes may be made as to the particular details of the circuitry and software without departure from the true spirit and scope of the appended claims. For example, there are modifications which may be made to the indicator circuits such as the audio circuit. Similarly, other types of visual indicators may be employed. Additionally, other choices for the microcontroller and reading and encoding device may be made.

What is claimed is:

1. A microprocessor controlled computer security system for controlling access to components of a computer system, said security system comprising, in combination:

magnetic card reading and encoding means for reading input signals from a magnetically encoded card, said magnetically encoded card including at least one magnetically encoded data track;

microcontroller means for processing said input signals read by said magnetic card reading means and responsively providing computer system component enable and disable signals and indicator signals, wherein a component enable signal is provided in response to a first reading of an input signal by the magnetic card reading means and a component disable signal is provided in response to a subsequent reading of the same input signal by the magnetic card reading means;

component interface means for enabling and disabling at least one component of said computer system in response to said component enable and disable signals provided by said microcontroller means; and indicator means for indicating the status of said components and said security system in response to said indicator signals.

2. The computer security system as claimed in claim 1, wherein said magnetically encoded card includes plurality magnetically encoded data tracks that may be independently read by said magnetic card reading and encoding means, each data track designating the enablement and disablement of a specific component of said computer system.

3. The computer security system as claimed in claim 1, wherein the components enabled and disabled by said security system include a disk drive and a video display.

4. The computer security system as claimed in claim 1, wherein each read operation is performed upon insertion and retraction of said card into and out of said magnetic card reading and encoding means.

5. The computer security system as claimed in claim 1, wherein at least one data track of said magnetically encoded card includes a time field allocating a predetermined amount of computer system access time, said time field being decremented by said microcontroller means in proportion to the time said component designated by said data track including said time field is enabled, and said microcontroller means disabling said component enabled by said data track that includes said time field upon expiration of said computer system access time allocated by said time field.

6. The computer security system as claimed in claim 5, wherein said microcontroller means provides a first indicator signal to said indicator means for indicating that a first fraction of said system access time remains allocated by said time field, and a second indicator signal to said indicator means for indicating that a second fraction, less than said first fraction, of said computer system access time remains allocated by said time field.

7. The computer security system as claimed in claim 5, whereupon enabling said component designated by said data track including said time field, said magnetic card reading means zeros said time field on said data track whereby said magnetically encoded card may not be used to enable another component designated by said data track.

8. The computer security system as claimed in claim 7, whereupon disabling said component designated by said data track including said time field, said magnetic card reading means credits any residual computer system access time allocated by said time field to said magnetically encoded card.

9. The computer security system as claimed in claim 1, wherein said computer system is a personal computer.

10. The computer security system as claimed in claim 1, wherein said indicator means comprises a sound producing device responsive to said indicator signals.

11. The computer security system as claimed in claim 1, wherein said indicator means comprises at least one visual indicator light responsive to said indicator signals.

12. The computer security system as claimed in claim 1, wherein said component interface means enables the tube power of a video device of said computer system.

13. The computer security system as claimed in claim 12, wherein said component interface means includes an indicator means for indicating the imminent disablement of said video device.

14. The computer security system as claimed in claim 1 wherein said interface means comprises a peripheral interface circuit providing said enable and disable signals to a peripheral bus communicating with said components to be enabled or disabled.

15. The computer security system as claimed in claim 14 wherein said interface means further comprises a video adapter interface circuit responsive to said enable and disable signals that enables or disables the video display of said computer system.

16. The computer security system as claimed in claim 14 wherein said peripheral bus is connected to a hard disk drive of said computer system.

17. The computer security system of claim 14 wherein said components to be enabled or disabled connected to said peripheral bus are components of remote computer systems which are enabled or disabled in response to enable and disable signals from said microcontroller means.

18. The computer security system of claim 1 further comprising a program switch having a first condition and a second condition, said magnetic card reading and encoding means encoding said magnetically encoded card when said program switch is in said first condition, and reading said magnetically encoded card when said switch is in said second condition.

19. A security system for a network of personal computers linked together by a peripheral data bus, said network including a host computer, comprising, in combination:
at least one magnetically encodeable card, each card having a data track for encoding input signals permitting access to at least one predetermined components of personal computers in said network;
a reading and encoding unit for said card adapted for electrically communicating with said host computer of said network;
means for processing said input signals read by said reading and said encoding unit and for responsively generating component enable and disable signals; and
a peripheral interface circuit for interfacing said means for processing to said peripheral data bus such that said component enable and disable signals are sent to said predetermined components;
whereby said at least one predetermined components of computers of said network ar enabled in response to a reading of said data track of said card by said reading and encoding unit and disabled in response to a subsequent reading of said data track of said card by said reading and encoding unit.

20. In a computer system comprising a host computer, peripheral equipment in communication with said host computer, and a magnetic card reading and encoding device placed in communication with said host computer, a method of controlling access to said host computer and said peripheral equipment comprising the steps of:
a) encoding a magnetically encodeable card with signals for enabling a predetermined component of said computer system;
b) reading said magnetically encoded card with said magnetic card reading and encoding device when said card is inserted into said reading and encoding device;
c) enabling said predetermined component if said predetermined component is disabled when said card is read by said reading and encoding device; and
d) disabling said predetermined component if said predetermined component is already enabled when said card is read by said reading and encoding device.

21. The method as claimed in claim 20 wherein said card is provided with a time field and said time field is encoded with access time signals providing a finite amount of access time in which said predetermined component will be enabled, and wherein said method further comprises the steps of:
decreasing the access time encoded on said card of the time said component is enabled; and
crediting residual access time for said component when said card is retracted from said reading and encoding device after said card has been inserted into said reaching and encoding device when said predetermined component is already enabled.

22. The method as claimed in claim 21 wherein said time field is zeroed upon withdrawal of said card from said reading and encoding device after said card has been inserted into said reading and encoding device when said predetermined component is already disabled.

23. The method as claimed in claim 20 wherein said step of encoding further comprises the step of encoding said magnetically encoded card with a plurality of enable signals for enabling a plurality of predetermined components of said computer system.

24. The method as claimed in claim 23 wherein said plurality of predetermined components are linked to said host computer via a SCSI bus.

25. The method of claim 24 wherein at least one of said predetermined components is a hard disk drive of a remotely located computer.

26. The method of claim 21 wherein said method further comprises the step of providing a warning signal alerting the user that the expiration of the access time is imminent when said access time is nearly expired.

* * * * *